United States Patent [19]
Nishigaki et al.

[11] Patent Number: 5,651,344
[45] Date of Patent: Jul. 29, 1997

[54] INDUCTION AND INJECTION SYSTEM FOR MULTI-VALVE ENGINE

[75] Inventors: Masato Nishigaki; Mamoru Yoneyama; Humitoshi Sugiyama, all of Iwata, Japan

[73] Assignee: Yamaha Hatsudoki Kabushiki Kaisha, Iwata, Japan

[21] Appl. No.: 558,029

[22] Filed: Nov. 13, 1995

[30] Foreign Application Priority Data

Nov. 11, 1994 [JP] Japan .................................. 6-277537

[51] Int. Cl.[6] ........................................ F02B 15/00
[52] U.S. Cl. .................................................. 123/432
[58] Field of Search .......................... 123/432, 336, 123/308, 337, 184.14, 184.55

[56] References Cited

U.S. PATENT DOCUMENTS

| | | | |
|---|---|---|---|
| 5,186,140 | 2/1993 | Ueda et al. | 123/308 |
| 5,205,244 | 4/1993 | Nakamura et al. | 123/432 |
| 5,454,357 | 10/1995 | Elder | 123/337 |
| 5,477,823 | 12/1995 | Uchida | 123/308 |
| 5,526,789 | 6/1996 | Stein et al. | 123/432 |

Primary Examiner—Raymond A. Nelli
Attorney, Agent, or Firm—Knobbe, Martens, Olson & Bear LLP

[57] ABSTRACT

A valve body and injector nozzle support that can be utilized with a multi-port internal combustion engine cylinder head so that the induction passage can be tuned to provide a relatively small effective area to generate turbulence at low speeds and low loads and provide a substantially unrestricted passage under high speed high load conditions. A number of embodiments of such arrangements are disclosed and each is effective in improving the engine torque throughout the entire engine speed and load ranges.

26 Claims, 12 Drawing Sheets

5,651,344

1

INDUCTION AND INJECTION SYSTEM FOR MULTI-VALVE ENGINE

BACKGROUND OF THE INVENTION

This invention relates to an induction and injection system for a multi-valve engine and more particularly to an improved arrangement for adapting an existing engine to a split or tuned type of induction system.

It has been recognized that the performance of internal combustion engines can be significantly improved throughout their entire speed and load ranges if the induction is designed in such a way so as to function as a relatively small effective cross-sectional area system and one which generates turbulence under low speed low load conditions and which functions is a relatively unrestricted large effective cross-sectional area induction passage at high engine running speeds and loads. This type of system is frequently used in conjunction with engines having two intake valves per cylinder because such an arrangement lends itself to this type of tuning.

Specifically, because of the placement of the twin intake valves, it is possible to disable the flow through one intake valve under some running conditions to generate swirl. Alternatively, it is possible to configure a control valve in the cylinder head in such a way that the flow through one or both passages can be redirected to generate a motion called tumble. Tumble is a type of swirl which acts around an axis that is perpendicular to the cylinder bore axis rather than parallel to it as with conventional types of swirl.

In order to improve the power output of an engine, it has been proposed to employ three intake valves per cylinder. Such three valve engines have the advantage of providing a larger effective flow area with reduced inertia than using two larger intake valves. However, the typical placement of the three intake valves makes it more difficult to obtain the types of swirl or turbulence within the combustion chamber that has been found to be effective. It has been determined, however, that by redesigning the configuration of the cylinder head to incorporate control valves therein that three valves per engine combustion chambers can utilize the advantages of such type of tuned induction systems. However, there are many engines which have been designed without these concepts and in which it would be desirable to employ them.

It is, therefore, a principle object of this invention to provide an improved induction and injection system for an internal combustion engine wherein a conventional engine can be modified so as to include flow control and fuel injection arrangements wherein certain intake passages can be selectively disabled and/or the direction of the flow entering the combustion chamber can be significantly altered so as to generate tumble without necessitating redesign or reconstruction of the cylinder head.

It is a further object to this invention to provide an improved and simplified induction and injection system for a three valve cylinder engine wherein the desired flow characteristics can be selectively generated.

SUMMARY OF THE INVENTION

This invention is adapted to be embodied in an internal combustion engine that is comprised of a cylinder head having a combustion chamber surface operable with an associated cylinder bore and piston forming a combustion chamber. Intake passage means are formed in the cylinder head and extend from a common opening in an outer surface in the cylinder head to at least two intake ports to the combustion chamber surface for delivering a charge to the combustion chamber. A control valve assembly comprised of a control valve body is affixed to the cylinder head outer surface and defines a flow passage therethrough which communicates with the cylinder head intake passage opening. A control valve element is supported for movement within the control valve body between a closed position for substantially restricting the flow into the cylinder head intake passage and an open position wherein the flow into the cylinder head intake passage is substantially unrestricted. The control valve body mounts a fuel injector which injects into the intake passage through a port formed in the control valve body.

BRIEF DESCRIPTION OF THE DRAWINGS

FIG. 14 is a cross-sectional view taken through the control valve of the embodiment of FIG. 13 along a plane similar to the plane at which FIGS. 3, 6, 9 and 12 are taken.

DETAILED DESCRIPTION OF THE PREFERRED EMBODIMENTS

Figure 1:
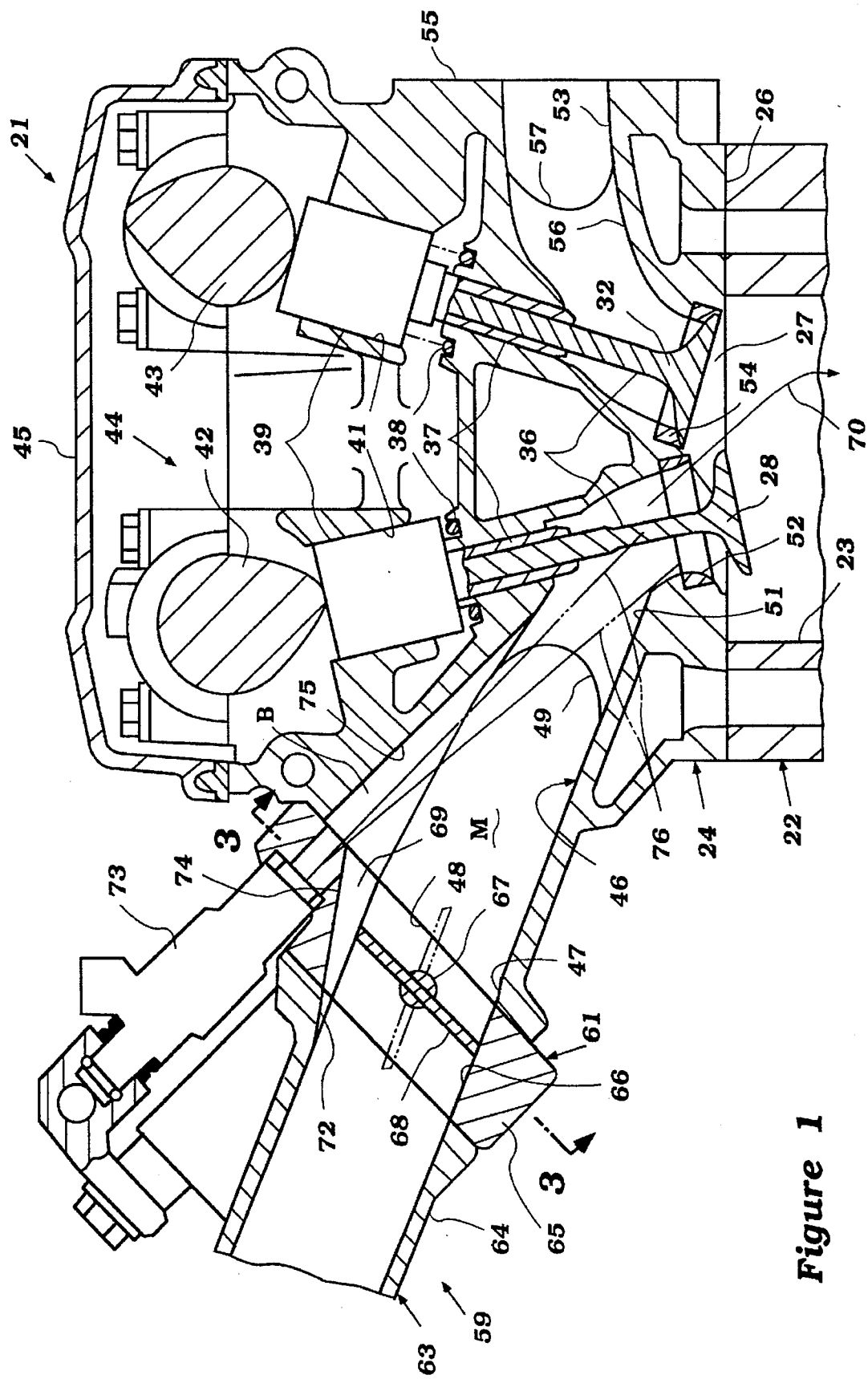
FIG. 1 is a cross-sectional view taken along the line 2—2 of FIG. 2 and shows a portion of an internal combustion engine constructed in accordance with a first embodiment of the invention.
Figure 2:
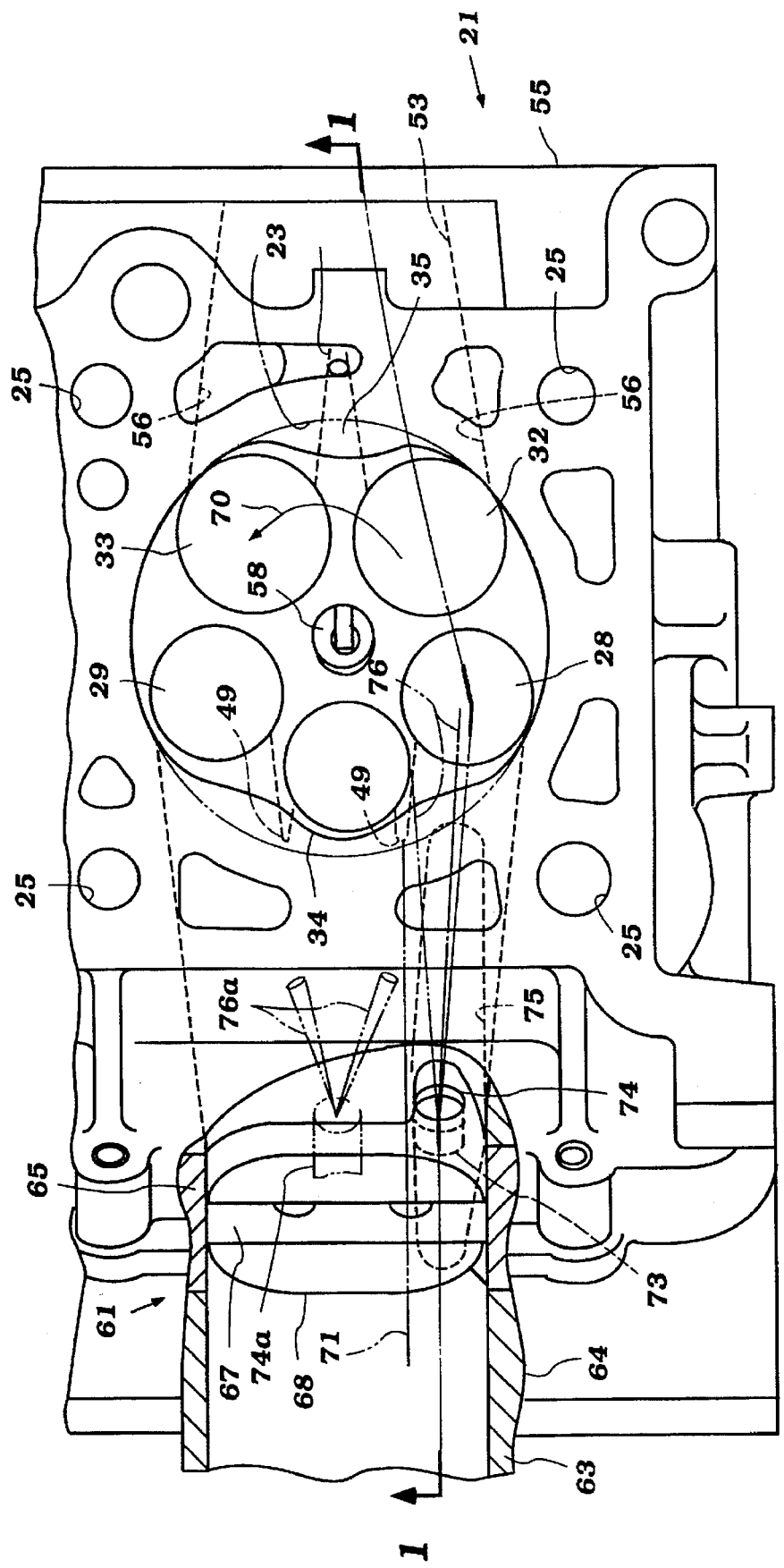
FIG. 2 is a bottom plan view of the portion of the engine shown in FIG. 1 looking at the bottom surface of the cylinder head and attached intake manifold and with a portion of the intake manifold and control valve body broken away. An alternate fuel injector location is also shown in phantom lines in this figure.
Figure 3:
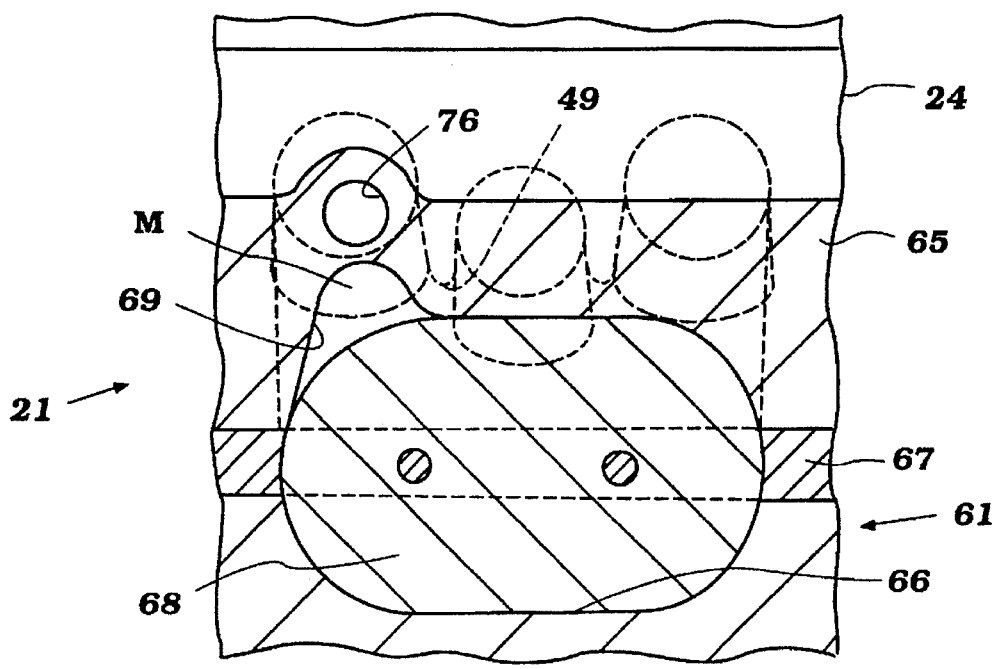
FIG. 3 is a cross-sectional view taken along the line 3—3 of FIG. 2 and shows the control valve in its closed, flow redirecting directs position.

Referring now in detail to the drawings and initially to the embodiment of FIGS. 1–3, an internal combustion engine constructed in accordance with an embodiment of the invention, is shown partially and is identified generally by the reference numeral 21. As will become apparent, the basic construction of the engine 21 is one which may be considered to be a conventional type of internal combustion engine having three intake valves per cylinder. In accordance with the invention, however, a control valve and fuel injector arrangement is added to the engine so as to convert the conventional induction system to one that can practice the invention to improve the engine performance throughout the entire engine speed and low ranges.

For the reasons aforenoted, only a single cylinder of the engine has been depicted and that has only been illustrated partially. It is believed readily apparent to those skilled in the art how the invention may be practiced with multiple cylinder engines of any configuration. Also, although the invention is described with a three intake valve per cylinder engine, it will be apparent to those skilled in the art that certain facets of the invention may be utilized with more conventional two intake valve per cylinder engines or with engines having more than three intake valves per cylinder.

The engine 21 is comprised of a cylinder block 22 which is shown only partially and is identified generally by the reference numeral 22. The cylinder block 22 defines at least one cylinder bore 23 in which a piston (not shown) is supported for reciprocation. A cylinder head assembly, indicated generally by the reference numeral 24 is affixed to the cylinder block 22 by fasteners which pass through openings 25 formed in the cylinder head 24. The cylinder head 24 has a lower sealing surface 26 that is brought into mating engagement with the upper deck of the cylinder block 22 or an interposed head gasket so as to provide a fluid tight seal around the cylinder bore 23.

The sealing surface 26 of the cylinder head 24 has a recess 27 formed in its lower surface which recess along with a portion of the surface 26, the cylinder bore 23 and the head of the aforenoted piston define a combustion chamber. The volume of this combustion chamber varies cyclically as the piston reciprocates, as is well known in this art. Because the cylinder head recess 27 forms the major portion of the clearance volume at top dead center, at times it will be referred to as the combustion chamber.

The cylinder head 24 is, as noted, of the three intake valve per cylinder type. As may be seen in FIG. 2, this valve arrangement includes a pair of side intake valves 28 and 29 which lie closer to a plane containing the axis of the cylinder bore and on opposite sides of a center intake valve 31. The side intake valves 28 and 29 may partially overlap the aforenoted plane and extend onto the other side of the cylinder head wherein a pair of exhaust valves 32 and 33 are positioned.

It will be seen that the intake valves 28, 29 and 31 extend in part inwardly so that a squish area 34 is formed on the outer side of the intake valves 28, 29 and 31 over the cylinder bore 23 as shown in phantom lines in FIG. 2 so as to increase turbulence as the piston approaches top dead center. In a similar manner, a squish area 35, is formed on the opposite side of the cylinder bore 33 between the exhaust valves 32 and 33 on the exhaust side of the engine.

The intake valves 28, 29 and 31 and exhaust valves 32 and 33, each have respective stem portions 36 that are slidably supported in valve guides 37 pressed or cast into the cylinder head 24 for their reciprocal support. Coil compression springs 38 act against the cylinder head surface and keeper retainer assemblies (not shown) on the upper ends of the valve stems 36 for urging all of the valves 28, 29, 31, 32 and 33 to their closed positions.

The specific orientation of the valves 28, 29, 31, 32 and 33 may be of any type known in the art, for example, as shown in U.S. Reissue Patent No. Re.33787, assigned to the assignee hereof.

Each of the valves 28, 29, 31, 32 and 33 has associated with the upper portion of its stem a thimble type tappet 39 each of which is supported in a respective bore 41 formed in the cylinder head 24. The thimble tappets 39 associated with the intake valves 28, 29 and 31 are operated by means of an overhead mounted intake cam shaft 42. The intake cam shaft 42 is rotatably journalled in the cylinder head assembly 24 in any suitable manner and is driven by a timing drive at one-half crankshaft speed, as is well known in this art.

In a similar manner, an exhaust cam shaft 43 is journaled in the cylinder head assembly 24 in a known manner and is associated with the exhaust valve tappets 39 for actuating the exhaust valves 32 and 33. Like the intake cam shaft 42, the exhaust cam shaft 43 is driven at one-half crankshaft speed in any suitable manner.

The intake and exhaust cam shafts 42 and 43 and the valve actuating mechanism as thus far described is contained within a cam chamber 44, formed by the upper portion of the cylinder head 24. This cam chamber is completed and closed by a cam cover 45 that is affixed to the cylinder head 24 in a suitable manner.

A Siamese type intake passage, indicated generally be the reference numeral 46 extends through an opening 47 formed in an exterior surface 48 of the cylinder head 47. This intake passage 46 extends to and terminates at valve seats which are valved by each of the intake valves 28, 29 and 31. The area of the intake passage 46 leading up to the individual valve seats are separated from each other by relatively short walls 49 formed integrally within the cylinder head 24. From these walls, the passages curve downwardly as indicated at 51 to respective valve seats 52 which are affixed in the cylinder head in an appropriate manner.

In a similar manner, a Siamese type exhaust passage 53 extends from exhaust valve seats 54 to an outlet opening formed in an exterior surface 55 of the cylinder head assembly 24. The exhaust passage 53 is divided into two portions 56 by a short interior wall 57 of the cylinder head 24. A suitable exhaust system (not shown) is affixed to the exhaust side of the cylinder head and specifically at surface 55 for collecting the exhaust gases and discharging them to the atmosphere.

Finally, the cylinder head 24 is formed with a central opening for each cylinder bore which opens into the recess 27. A spark plug 58 is mounted in each of these central openings and has its gap disposed generally centrally in the combustion chamber 27 for igniting the charge therein in a known manner.

The portion of the engine as thus far described may be considered to be conventional or, alternatively, any conventional structure of the type employed with 5 valve per cylinder engines may be used to practice the invention. That is, the basic construction of the cylinder head assembly thus far described forms the basic construction with which the invention may be practiced, as will be apparent to those skilled in the art.

With this type of arrangement, the intake valves 28, 29 and 31 provide a very large effective inlet area that will permit good breathing efficiency and the attainment of high power outputs. However, this large flow area will mean that under low speed running the air charge that enters the combustion chamber and which has a relatively small volume will flow very slowly. As a result, combustion will be slow and rough at idle. Thus, in accordance with the invention, an induction system indicated generally by the reference numeral 59 is provided which has as its major component a control valve and injector support assembly, indicated generally by the reference numeral 61. The conventional portion of the induction system 59 will be described first and then the control valve assembly 61 and the injection system will be described.

Before that description however, it should be noted that the control valve assembly 61 is designed so as to convert the engine into an engine that will operate better at low speeds and low loads without sacrificing high end performance. In fact, high end performance can be improved because no comprises need to be made to improve low speed running as is typical with conventional engines. The manner in which these results are achieved will become apparent as the description proceeds.

Turning now specifically to the induction system and to the conventional portion of it, an air inlet device (not shown) collects atmospheric air and is provided with a throttle valve assembly that is manually operated for controlling the speed of the engine. This air inlet may include an air flow meter, air filter silencer, etc. and supplies air to an intake manifold, indicated generally by the reference numeral 63. This intake manifold 63 has a plurality of runner section 64 which are affixed in abutting relationship to a body 65 of the control valve assembly 61. This assembly is also detachably connected to the cylinder head surface 48 in registry with the intake passage opening 47.

The manifold runner 64 has a flow passage therein which is generally complementary to a flow passage 66 formed in the control valve body 65. This configuration is also complimentary to that of the opening 47 so as to provide a relatively smooth unencumbered flow path.

A control valve shaft 67 is rotatably journaled in the body 65 and carries on at a control valve element 68. The control valve element 68 has a peripheral configuration which is complimentary to the shape of the flow passage 66 so that when the control valve element 68 is in its fully closed position, flow through the control valve 61 is substantially precluded, except as will now be noted.

In accordance with this embodiment the invention, the control valve body 65 is provided with a by-pass flow opening 69 that is disposed so that it is on a center line which is generally a line with the center of the intake passage portion which serves the first side intake valve 28 and specifically its seat. Hence, this opening is generally disposed between a plane 71 (FIG. 2) that is aligned with the dividing wall 49 between the first side passage portion and the center passage portion. The reason for this will become apparent.

In order to provide a smoother transitional flow across and through the recess passage 69, the manifold runner 64 may be provided with a complimentary lead in recess, indicated by the referenced numeral 72. Thus, when the control valve 68 is in its closed position, as it is at idle and low speed, the air flow will be restricted to that that can pass through the passage portions 72 and 69. Since this is disposed on the upper side of the intake passage 46 and adjacent the first side intake valve 28 the entire air flow will be directed as shown by the arrow 70 in FIG. 1 in a direction across the cylinder bore so as t6 generate a tumble action.

In addition, and as shown as the arrow 72 in FIG. 2, there will also be some swirl generated to effect what is called slant tumble action. Hence, under low speed low load conditions the restricted flow passageway and the redirection of the flow into the combustion chamber will cause an increase in velocity for the low air flow and generate the desired turbulence in the combustion chamber so as to promote more rapid flame propagation and complete combustion.

In addition to providing this by-passing and control function for the intake air, the control valve assembly 61 also provides a mounting arrangement for an electronically operated fuel injector, indicated generally by the referenced numeral 73. The injector 73 receives fuel from the fuel supply system through a fuel rail in a known manner. The injector 72 has its nozzle portion mounted in a nozzle port 74 that is formed in the control valve body 65 and which intersects at its downstream end, the flow by-pass passage 69.

In addition, the cylinder head is provided with a machined recess passage 75 which cooperates with the manifold passage 72 and control body passage 69 so as to provide a by-pass control path indicated by the reference character B around the main induction system flow path indicated by the referenced character M. The discharge path from the fuel injector 73 is of a conical spray pattern path as indicated by the reference numeral 76 in the Figures and is disposed so as to partially impinge upon the wall 49 at the side of the first side intake passage portion and also to be directed toward the valve seat 52 so as to enter the combustion chamber 27 along with the high velocity air flow. As a result of this, the mixture will be well distributed in the combustion chamber by the swirl and tumble action and, in fact, it may be possible to obtain some stratification of the charge flow.

As has been previously noted, the control valve 68 is held in its closed flow restricting flow redirecting position during low speed and idle operation and as the speed and load on the engine increases, the control valve 68 will be open so as to meet the increasing charge requirements. Even though the injector 73 injects toward only the first side intake passage, by increasing the amount of fuel introduced there will still be adequate fuel for all running conditions.

As an alternative arrangement, however, the control valve body 65 may be provided with a mounting port disposed centrally in the passage 66 but still spraying through a separate nozzle port as indicated at 74a in FIG. 2. In this arrangement, it is preferred to provide the injector with a pair of nozzle ports that will have a spray pattern as indicated at 76a in FIG. 2. The spray paths are directed toward the two side intake passage portions.

Figure 6:
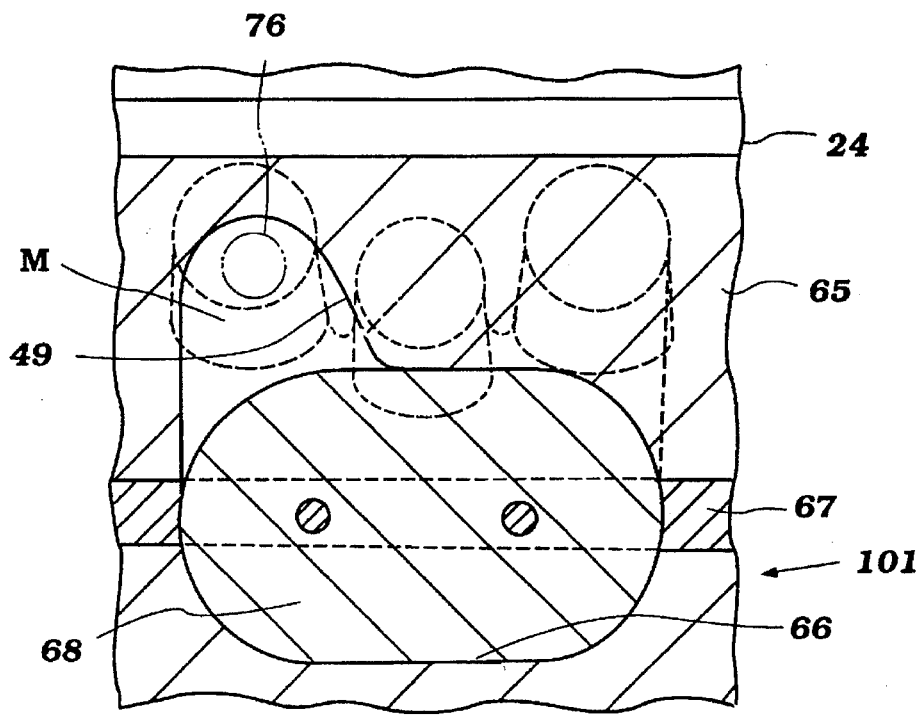
FIG. 6 is a cross-sectional view, in part similar to FIG. 3, but shows the control valve for this embodiment and in its closed position.
Figure 4:
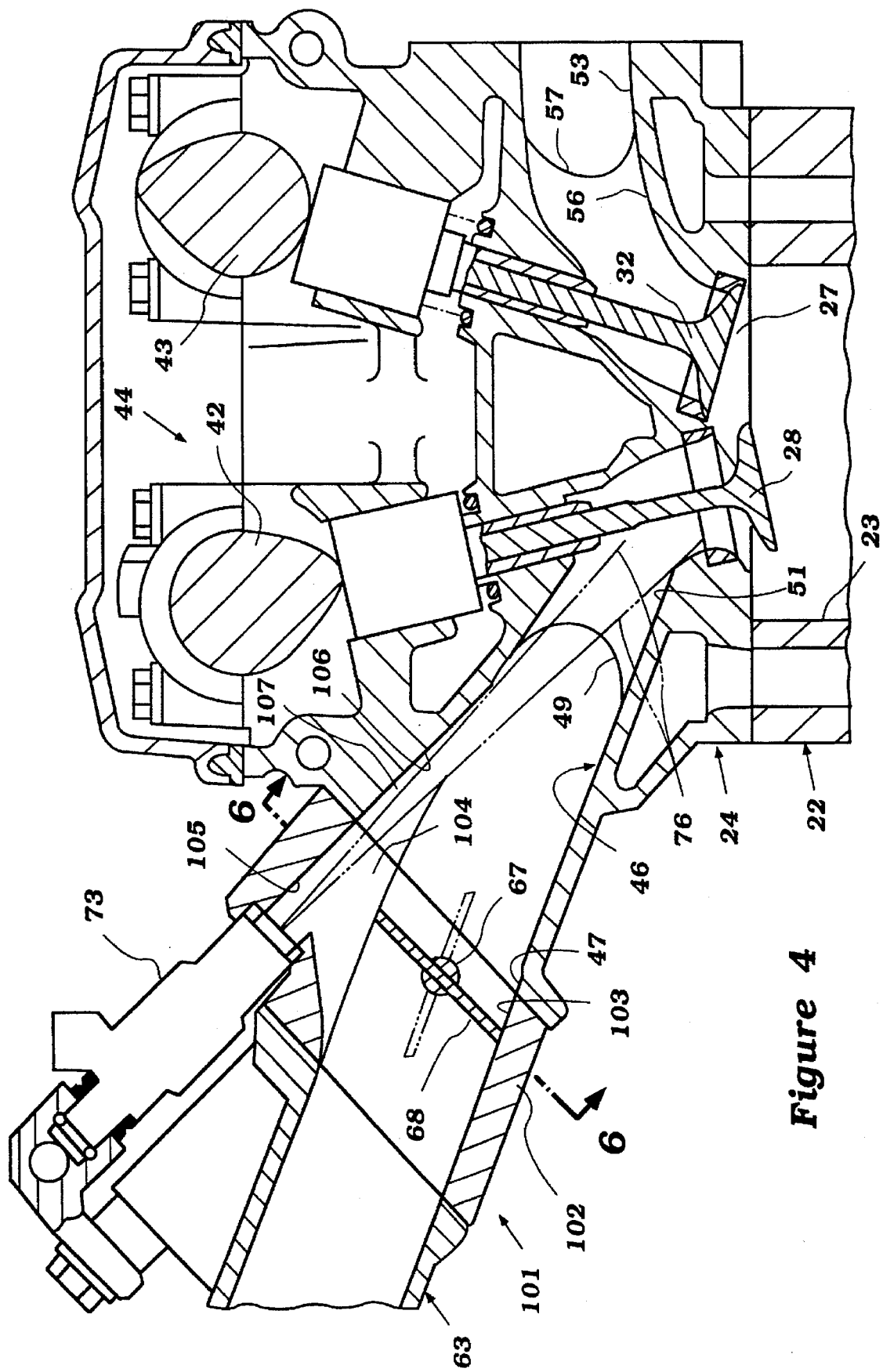
FIG. 4 is a cross-sectional view, in part similar to FIG. 1, taken along the line 4—4 of FIG. 5 showing another embodiment of the invention.
Figure 5:
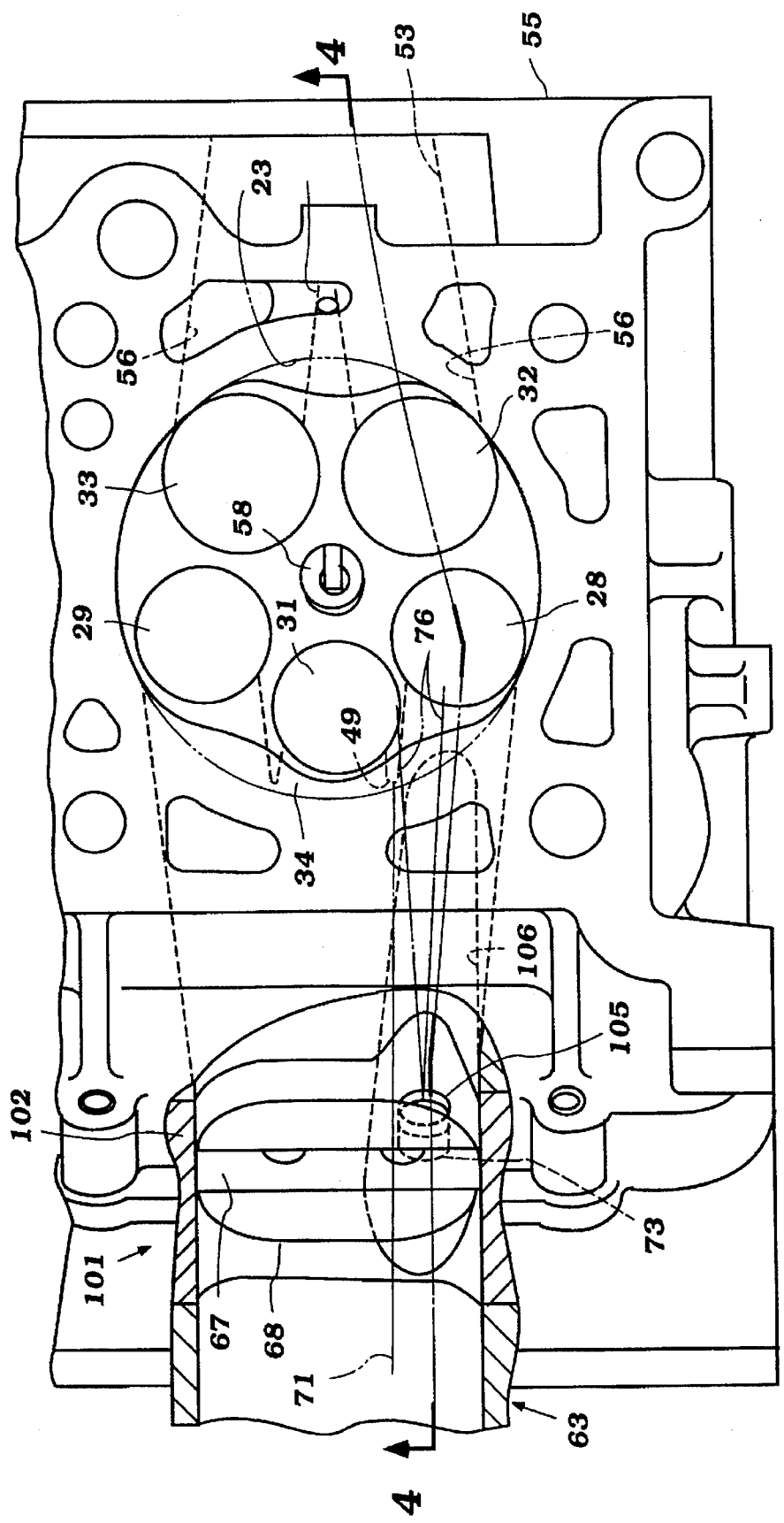
FIG. 5 is a bottom plan view of the cylinder head and induction system, in part similar to FIG. 2, for this embodiment.

FIGS. 4–6 show another embodiment of the invention which is basically the same as the embodiment thus far described but which necessitates less machining of the conventional cylinder head 24 and requires no machining of the conventional intake manifold 63. Thus, the major portions of the invention are embodied in the control valve assembly, indicated generally by the reference numeral 101 in these figures.

Except for the aforenoted differences in machining of the cylinder head 24 and intake manifold 63, these components are the same as previously described and hence their description will not be repeated. In addition and for the same reasons, those reference numerals utilized to identify the various components in the prior figures have been employed and further description of them will not be made except insofar as is necessary to understand the construction and operation of this embody.

In this embodiment, the control valve assembly 101 has a body portion 102 which has a greater effective length than the previously described embodiment, for a reason which will become apparent, and which is formed with a main passage portion 103 that is configured the same as the manifold runner portion 64 and the cylinder head intake portion 46 and specifically its opening 47.

Therefore, a control valve of substantially the same construction as previously described including a control valve shaft 67 and a control valve plate 68 are employed for closing off this passage 103 under low speed low load conditions. In this embodiment, an enlarged by-pass passage way 104 begins at the manifold adjacent face and continues on to merge into an injector port opening 105 which receives the fuel injector 73. In this embodiment, the injector port opening 105 is spaced further away from the main center of the flow path through the opening 103 so that the angle of the cut-out 106 in the cylinder head to form a complimentary flow path 107 can be reduced and more steeply angled.

Thus, the spray pattern will enter the combustion chamber in the same direction as previously described but the amount of machining of the conventional components is substantially reduced. This embodiment has basically the same flow properties as previously described and utilizes the same basic control strategy. For that reason, for the description of the construction and operation of this embodiment is not believed to be necessary to permit those skilled in the art to understand and utilize the invention.

Figure 7:
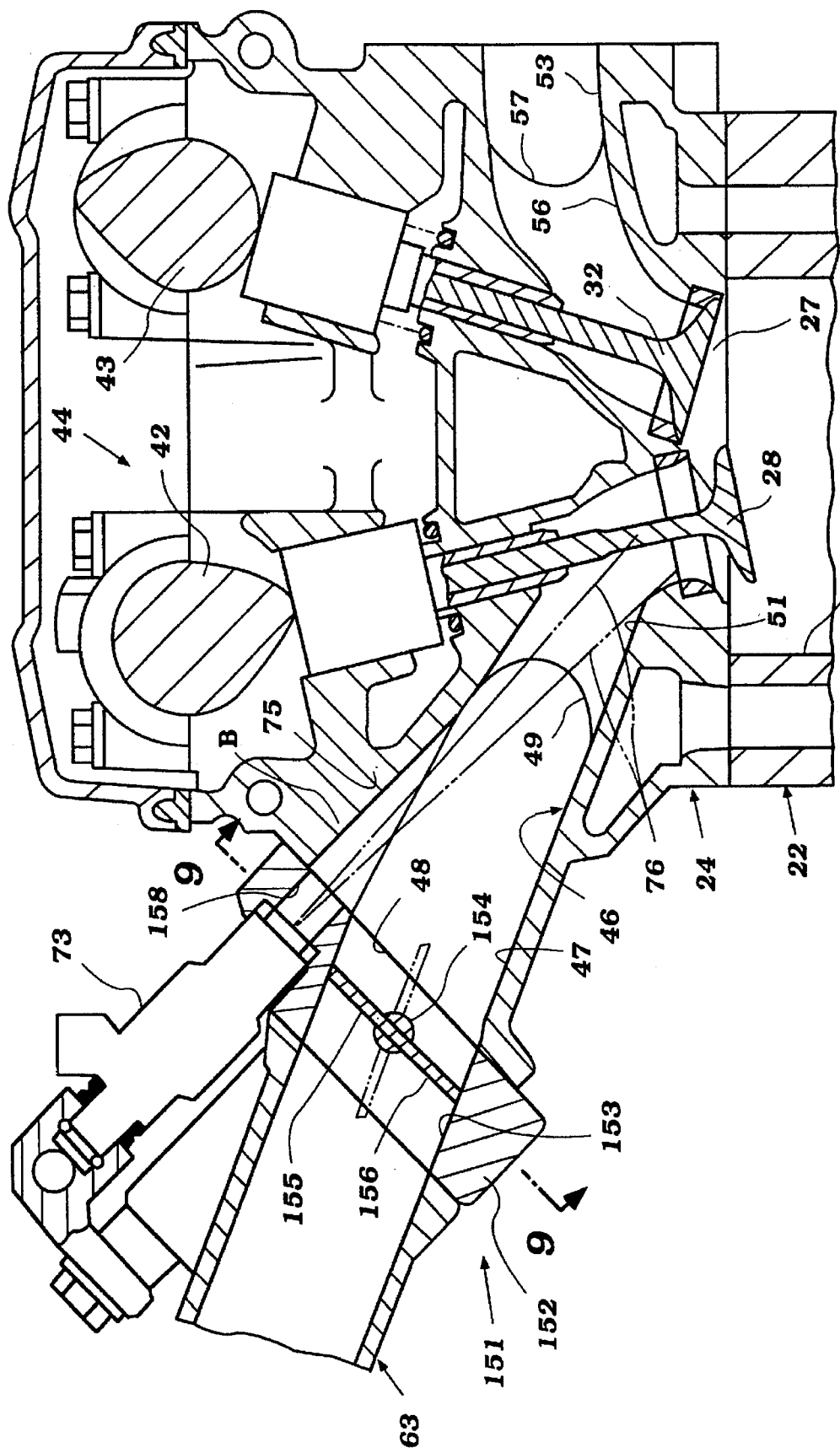
FIG. 7 is a cross-sectional view taken along the line 7—7 of FIG. 8, in part similar to FIGS. 1 and 4, and shows yet another embodiment of the invention.
Figure 8:
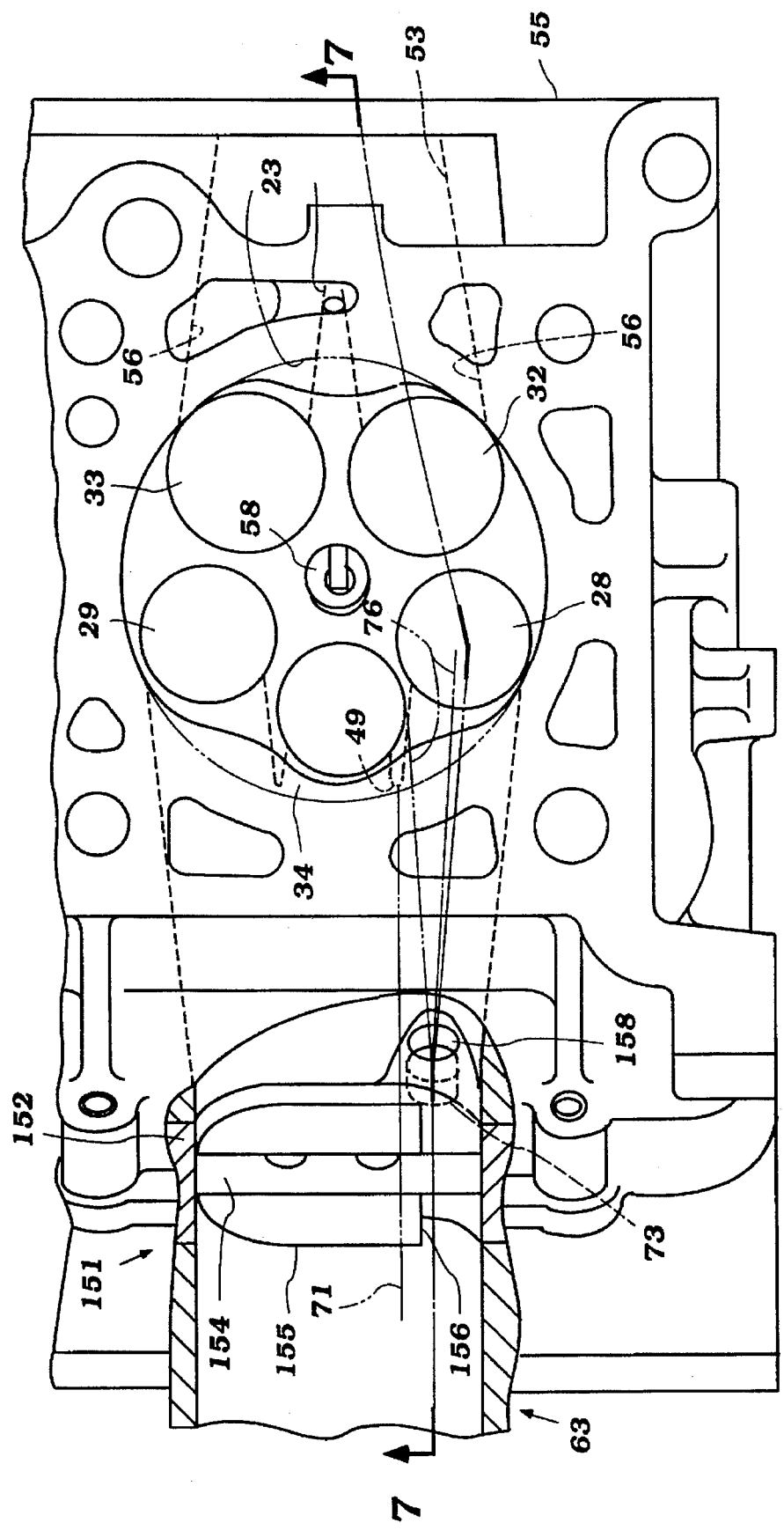
FIG. 8 is a bottom plan view of the cylinder head of this embodiment with a portion broken away and is in part similar to FIGS. 2 and 5.
Figure 9:
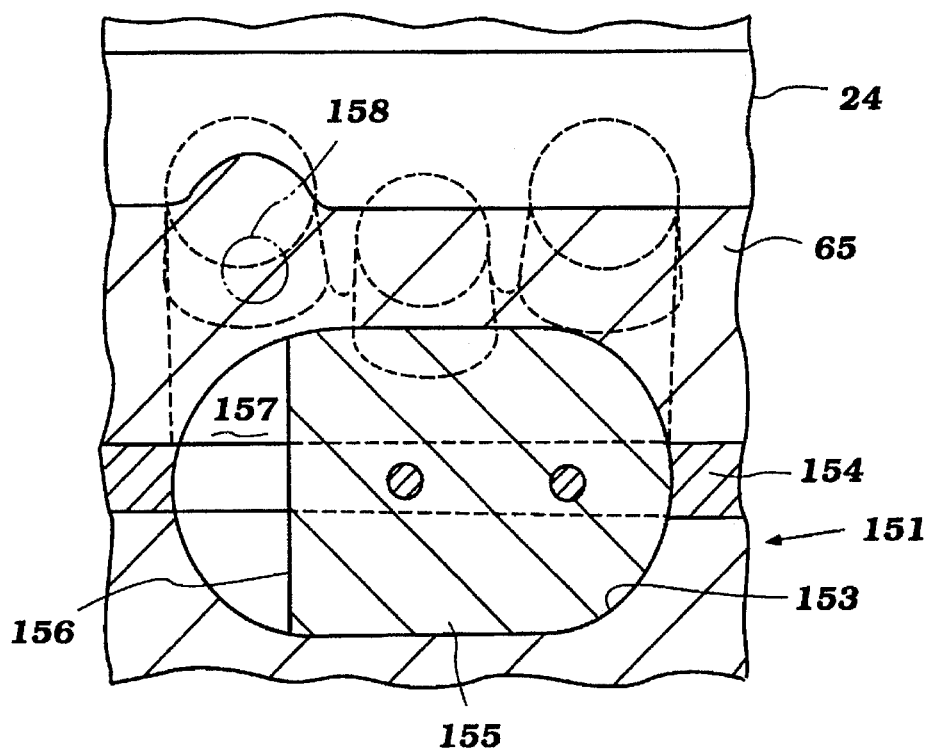
FIG. 9 is a cross-sectional view taken along the line 9—9 of FIG. 7 and shows the control valve in this embodiment in its closed position.

Another embodiment of the invention is shown in FIGS. 7–9. Like the embodiments previously described, this embodiment differs from the conventional engine construction primarily in the construction and arrangement of the control valve assembly indicated generally by the reference numeral 151 in this embodiment. This embodiment, like the embodiment of FIGS. 4–6, requires less machining for the components of the conventional engine. In this embodiment, the control valve 151 includes a valve body 152 which again is sandwiched between the intake manifold 63 and the cylinder head surface 48. An opening 153 extends through the body 151 and is complimentary in configuration to the opening portion 47 of the cylinder intake passageway 46.

Like the previously described embodiments, a control valve is provided in the valve body but this control valve has a different configuration for establishing the flow path to the one side intake passageway when in its closed position. As may be best seen in FIG. 9, although the construction also appears in FIG. 8, the control valve includes a control valve shaft 154 that extends transversely across the passage 66 and onto which a valve plate 155 is affixed. Like all of the previously described embodiments, the valve plate 155 has a configuration that is substantially complimentary to the opening 153 and would substantially close this opening when the control valve element 155 is in its closed position as shown in FIGS. 7 and 9.

Like the previously described embodiments, a flow path is provided around the control valve 155 when in this position which is directed toward the first side intake valve passage portion. In this embodiment, however, a cutout 156 is formed along one side of the control valve element 155 rather than in the valve body, as in the previously described embodiments. This thus results in a flow area 157 which extends along one side of the passage opening 153 and which is aligned with the extreme side of the first side intake passage so as to further augment the flow redirection and increase the velocity of swirl and tumble.

In this embodiment, a nozzle port passage 158 is formed in the control valve body 152 and is directed so that the fuel spray from the injector 73 will follow the same general type of flow path, indicated by the reference numeral 76 as previously described. Again, the control strategy is to maintain the control valve 155 in its closed flow accelerating and redirecting position at most speed and lower mid-range and then open the control valve 155 to improve charging efficiency as the speed and load of the engine increases.

Figure 10:
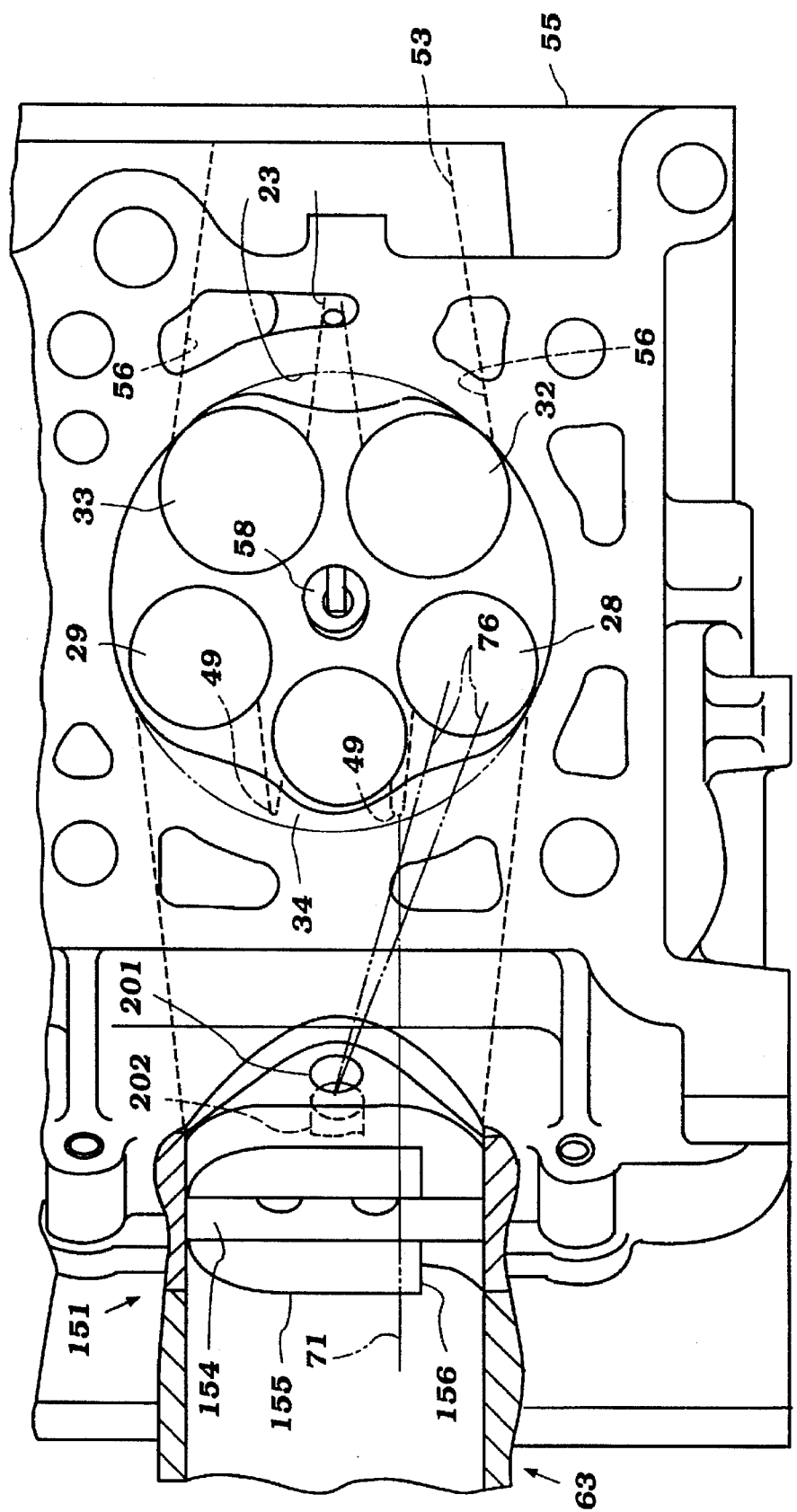
FIG. 10 is a bottom plan view, in part similar to FIG. 8, and shows another embodiment of this invention during a first phase of the running condition.
Figure 11:
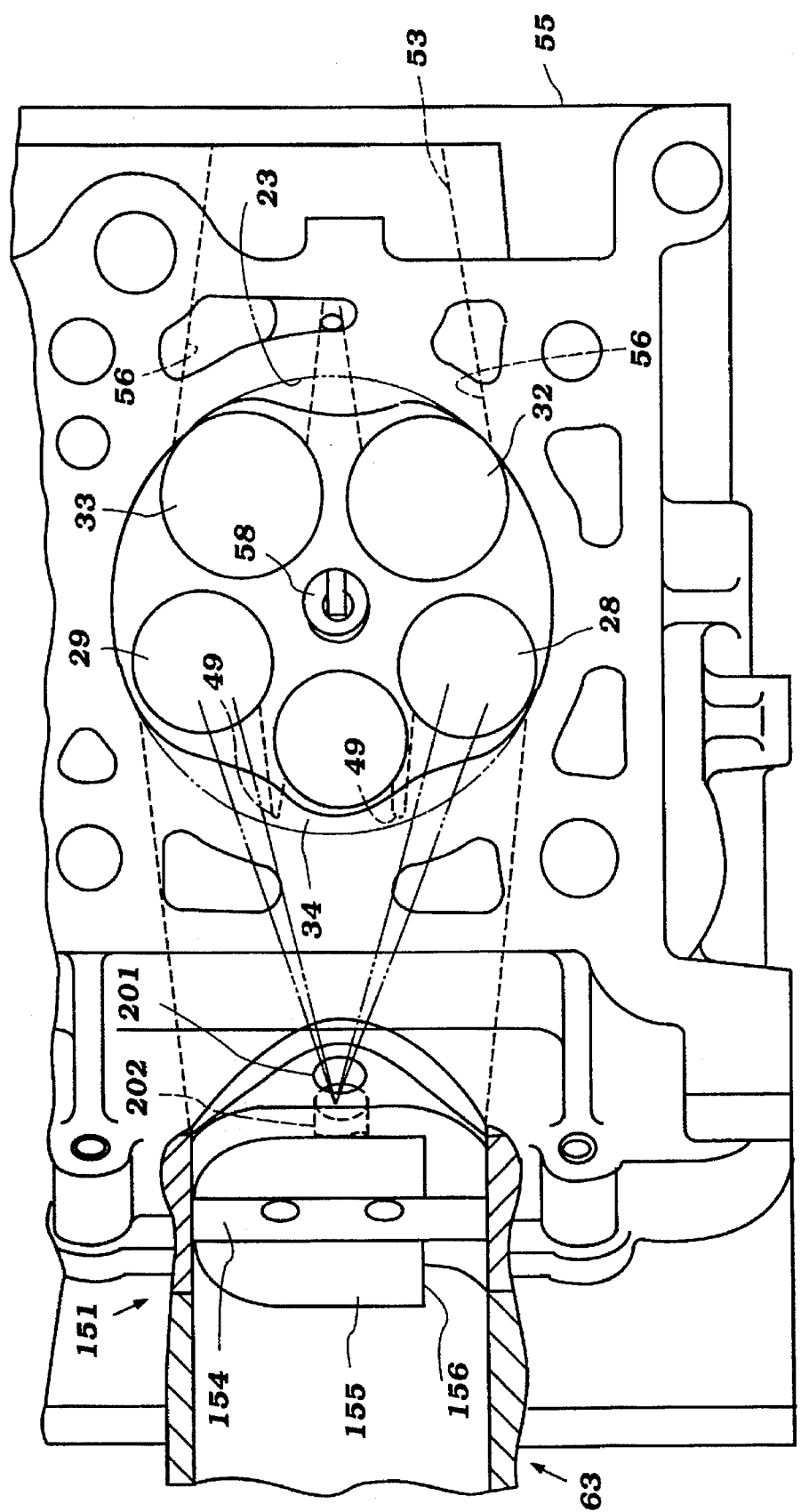
FIG. 11 is a bottom plan view, in part similar to FIG. 10 and shows the running condition at another phase of operation.
Figure 12:
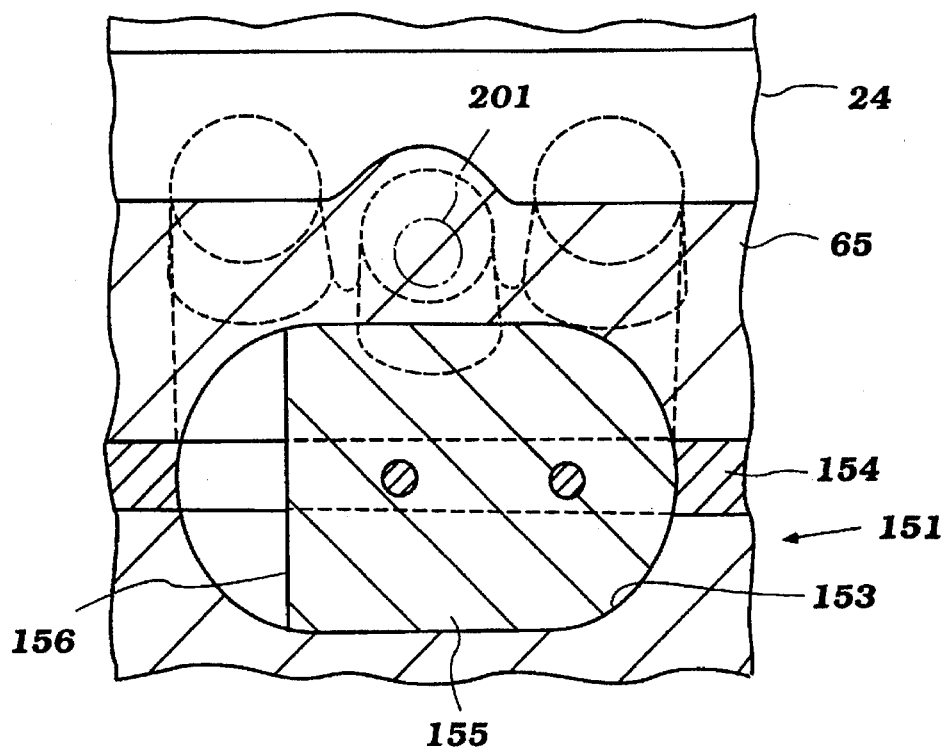
FIG. 12 is a cross-sectional view taken along the same plane as FIG. 9 but showing the injector arrangement as employed in FIGS. 10 and 11.

FIGS. 10–12 show another embodiment of the invention which utilizes a control valve of the type shown in FIGS. 7–9 and which control valve is, therefore, indicated by the same reference numerals as those previously employed and which will not be described again. In this embodiment, however, the control valve body 155 is provided with an injector port 201 that is generally centrally disposed and which mounts a fuel injector 202. The fuel injector 202 is of a type having two spray nozzles which can be controlled independently of each other.

Therefore, when operating at low speed low load conditions and when the control valve 155 is in its closed position, the spray pattern is in the direction so that the spray 76 goes toward the first side intake passage portion as seen in FIG. 10. However, as the speed and load increases and the control valve 155 is moved to its fully opened position as shown in FIG. 11, another nozzle having a spray port directed toward the remaining side intake passage is actuated so that there will be a more homogeneous fuel air mixture delivered to the engine.

Figure 13:
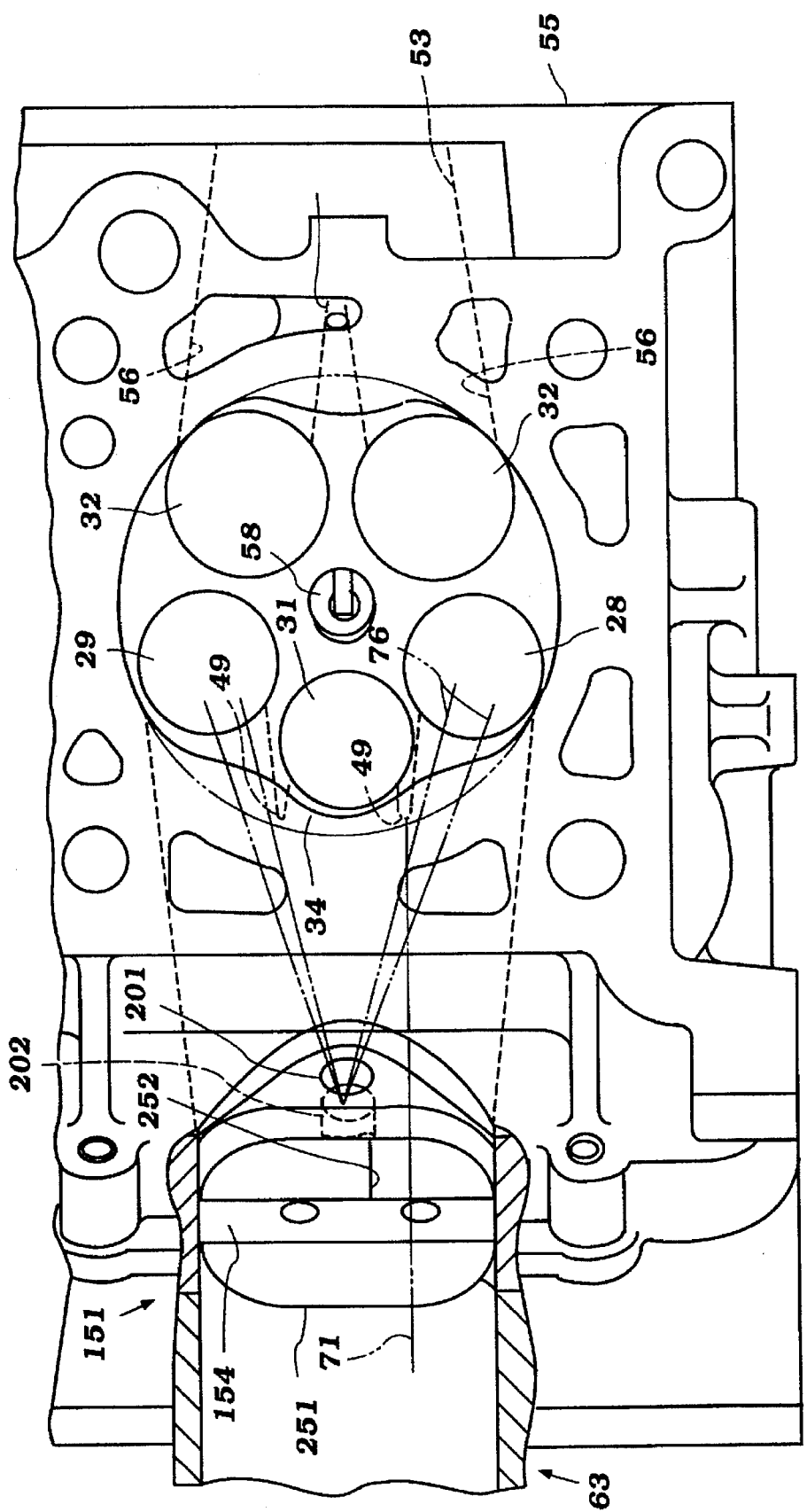
FIG. 13 is a bottom plan view, in part similar to FIGS. 2, 5, 8, 10 and 11, and shows yet another embodiment of the invention.
Figure 14:
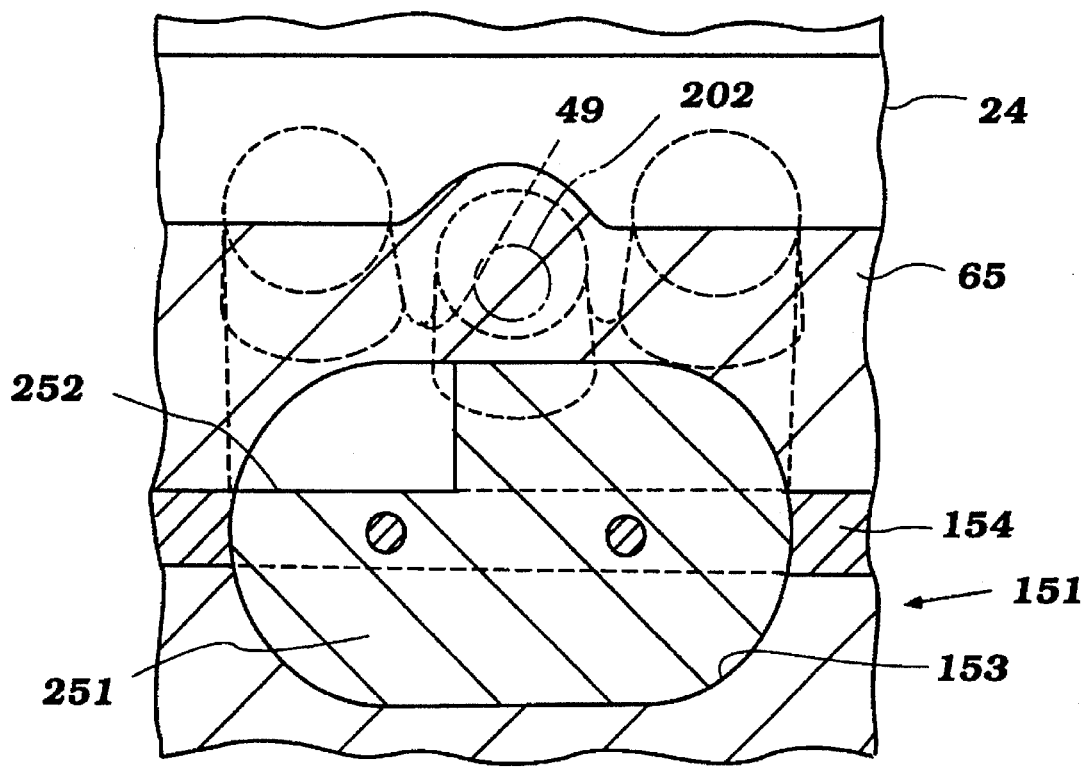

FIGS. 13 and 14 show the final illustrated embodiment and this embodiment basically utilizes an injector and control system as shown in the embodiments of FIGS. 10–12. However, in this embodiment the valve plate, indicated generally by the referenced numeral 251, has a shape that is substantially the same as the intake passage portion 153. However, a pie shaped cut-out 252 is formed in the upper area of the control valve plate 251 so as to direct the flow not only to the side of the first side intake passage portion 51 but also toward its upper perimeter. This will reduce the amount of swirl and increase the amount of tumble. In all other regards, this embodiment is the same as those previously described and, therefore, a further description of it is not believed to be necessary to permit those skilled in the art to practice the invention of this embodiment.

From the foregoing description it should be readily apparent that the described embodiments are particularly useful in permitting a conventional engine having three valves per cylinder to be modified so as to generate a higher velocity and tumble or swirl or combination thereof under low speed low running conditions to improve performance under these conditions. This can be done without any significant modification of the basic engine components and thus can be easily be offered as an option to a particular engine or engine family.

Of course, those skilled in the art will readily understand that the foregoing description is that of preferred embodiments of the invention and that various changes and modifications may be made without departing from the spirit and scope of the invention, as defined by the appended claims.

What is claimed is:

1. An internal combustion engine comprised of a cylinder head having a combustion chamber surface cooperable with an associated cylinder bore and piston for forming a combustion chamber, intake passage means formed in said cylinder head and extending from a common opening in an outer surface of said cylinder head to at least two intake ports in said combustion chamber surface for delivering a charge to said combustion chamber, a control valve assembly comprised of a control valve body affixed to said cylinder head outer surface and defining a flow passage therethrough communicating with said cylinder head intake passage opening, a control valve element supported for movement between a closed position for substantially restraining flow through said intake passage means and an open position wherein the flow through said intake passage means is substantially unrestricted, and means for defining a restricted flow area past said control valve element in substantial part in said control valve assembly for permitting flow therepast when said control valve element is in its closed position and toward substantially only one of said intake ports for redirecting the flow into said combustion chamber and for increasing the velocity of such flow.

2. An internal combustion engine as set forth in claim 1, wherein the restricted flow area is formed in substantial part in the valve body around the opening therethrough.

3. An internal combustion engine as set forth in claim 2, wherein the restricted flow area is formed at one side of the valve body.

4. An internal combustion engine as set forth in claim 2, wherein the restricted flow area is formed on an upper edge of the valve body.

5. An internal combustion engine as set forth in claim 4, wherein the restricted opening is formed also only on one side of the valve body.

6. An internal combustion engine as set forth in claim 1, wherein the restricted flow area is formed by the valve element.

7. An internal combustion engine as set forth in claim 6, wherein the restricted flow area is formed on one side of the valve element.

8. An internal combustion engine as set forth in claim 6, wherein the restricted flow area is formed on the upper edge of the valve element.

9. An internal combustion engine as set forth in claim 8, wherein the restricted flow area is also formed at one side of the valve element.

10. An internal combustion engine as set forth in claim 1, wherein the valve body further includes a nozzle port intersecting and directed toward the cylinder head intake passage opening for receiving an injector nozzle for injecting fuel into the cylinder head intake passage means.

11. An internal combustion engine as set forth in claim 10, wherein the nozzle port of the valve body is formed contiguous to and in registry with the restricted flow area.

12. An internal combustion engine as set forth in claim 10, wherein the nozzle port is disposed generally centrally of the valve body flow passage.

13. An internal combustion engine as set forth in claim 1, wherein the intake passage means terminates at three intake ports.

14. An internal combustion engine as set forth in claim 13, wherein the three intake ports comprise a pair of side intake ports disposed closer to a plane containing the axis of the cylinder bore than the third intake port which comprises a center intake port that is disposed between the side intake ports.

15. An internal combustion engine as set forth in claim 14, wherein the intake passage means comprises a Siamese-type intake passage terminating at three branch sections each leading up to a respective one of the valve ports.

16. An internal combustion engine as set forth in claim 15, wherein the restricted flow area is formed in substantial part in the valve body around the opening therethrough.

17. An internal combustion engine as set forth in claim 16, wherein the restricted flow area is formed at one side of the valve body.

18. An internal combustion engine as set forth in claim 16, wherein the restricted flow area is formed on an upper edge of the valve body.

19. An internal combustion engine as set forth in claim 18, wherein the restricted opening is formed also only on one side of the valve body.

20. An internal combustion engine as set forth in claim 15, wherein the restricted flow area is formed by the valve element.

21. An internal combustion engine as set forth in claim 20, wherein the restricted flow area is formed on one side of the valve element.

22. An internal combustion engine as set forth in claim 20, wherein the restricted flow area is formed on the upper edge of the valve element.

23. An internal combustion engine as set forth in claim 22, wherein the restricted flow area is also formed at one side of the valve element.

24. An internal combustion engine as set forth in claim 15, wherein the valve body further includes a nozzle port intersecting and directed toward the cylinder head intake passage opening for receiving an injector nozzle for injecting fuel into the cylinder head intake passage means.

25. An internal combustion engine as set forth in claim 24, wherein the nozzle port of the valve body is formed contiguous to and in registry with the restricted flow area.

26. An internal combustion engine as set forth in claim 24, wherein the nozzle port is disposed generally centrally of the valve body flow.

* * * * *